March 26, 1940. P. DUGELAY 2,195,082

TWO-STAGE-COMPRESSION INTERNAL COMBUSTION ENGINE

Filed June 22, 1935 3 Sheets-Sheet 1

INVENTOR:
PAUL DUGELAY
BY Haseltine, Lake & Co
ATTORNEYS

March 26, 1940.　　　　P. DUGELAY　　　　2,195,082

TWO-STAGE-COMPRESSION INTERNAL COMBUSTION ENGINE

Filed June 22, 1935　　　　3 Sheets-Sheet 2

INVENTOR:
PAUL DUGELAY
BY Haseltine, Lake & Co.,
ATTORNEYS

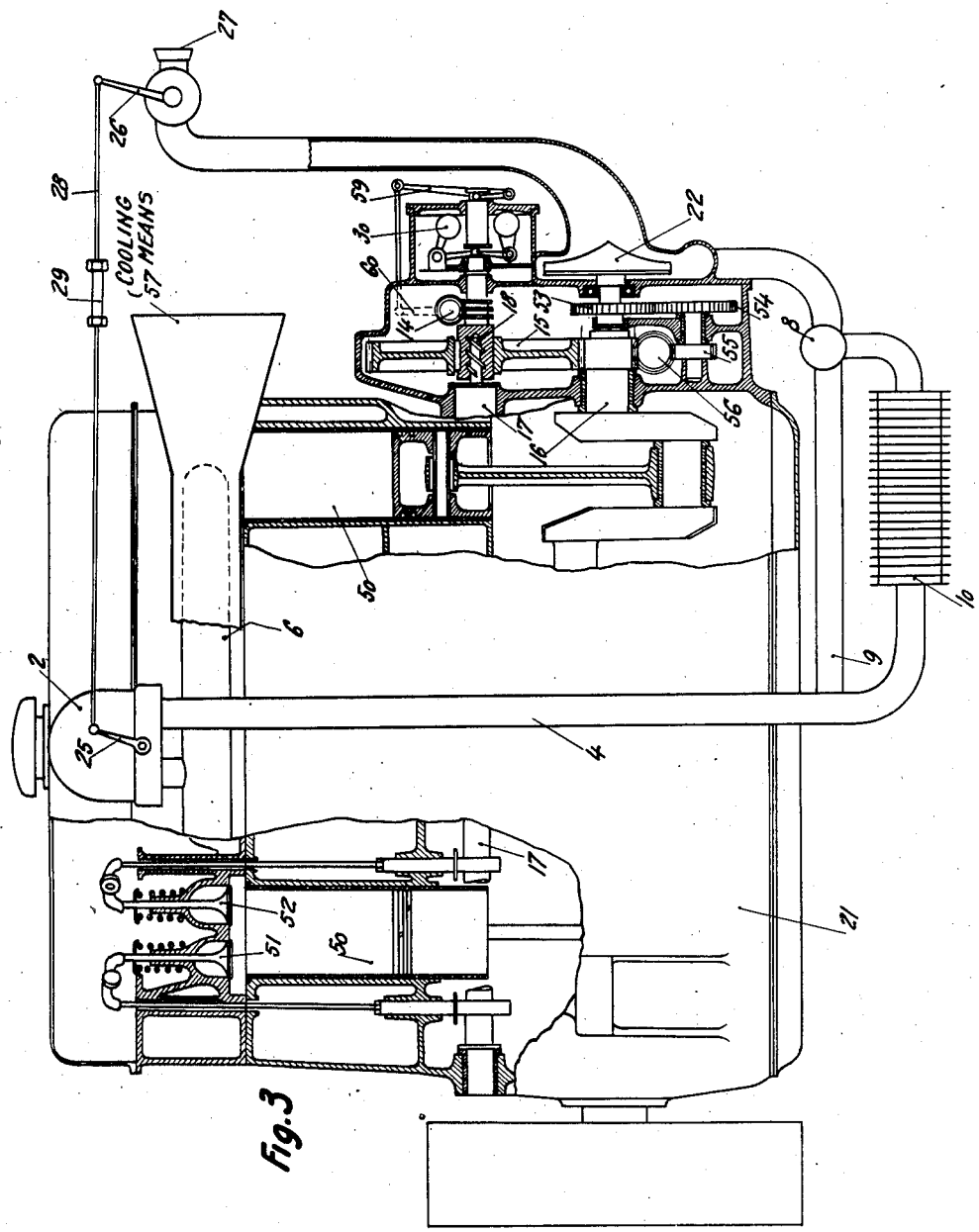

Patented Mar. 26, 1940

2,195,082

UNITED STATES PATENT OFFICE 2,195,082

TWO-STAGE-COMPRESSION INTERNAL COMBUSTION ENGINE

Paul Dugelay, Paris, France, assignor to Societe d'Exploitation de Brevets pour l'Industrie l'Aviation et l'Automobile (Sebia), Paris, France, a corporation of France Application June 22, 1935, Serial No. 27,927
In France June 25, 1934

17 Claims. (Cl. 123—119)

The present invention relates to improvements in internal combustion engines, particularly multi-cylinder 4-cycle engines, of the type operating with two-stage compression.

Internal combustion engines of the type to which the invention relates having two-stage compression operate according to a cycle which is different from that known under the name of Beau de Rochas and which, for the convenience of explanation, will hereinafter be termed the "Sebia cycle." An internal combustion engine operating with two-stage compression comprises essentially the combination of an engine in which the duration of the opening of the admission valve is extended beyond the normal duration (in such manner that a certain transfer of the compressed charge of admission gases takes place from one cylinder to another), and an air supply compressor, the role of which is to maintain as far as possible the pressure constant in the admission manifold of the engine, so that the transfer of the gases from one cylinder to the other during the extended period of the opening of the admission valve is effected under pressure.

In the known constructions of internal combustion engines of this type, a piston compressor is usually keyed on the crank shaft of the motor and a cam shaft device is provided which permits of extending considerably the duration of the opening of the admission valves.

The principle of the two-stage compression engine makes it possible to have three classes of engines:

1. Undercharged engine (the charge per revolution of the engine is greater than the charge per revolution of the compressor and under these conditions the rate of compression is lower than the rate of expansion).

2. Engine with normal charge (the charge of the engine is equal to the charge of the compressor and the rate of compression is equal to the rate of expansion).

3. Supercharged engine (the charge per revolution of the engine is less than the charge per revolution of the compressor and under these conditions the rate of compression is greater than the rate of expansion).

The characteristic feature of the cycle of operations in the above three classes of engines is that the point of separation of the first and second phase compressions corresponds to a point of cooling of the gases and is always located between the delivery phase of the compressor and that of compression in the engine cylinder, and under these conditions the rate of compression at the second stage in the engine cylinder is always less than the rate of expansion of the engine. The curve illustrating the double-stage compression consequently shows in all cases a flat part corresponding to the point of cooling and contraction of the gases.

The practical advantages of operating according to the Sebia cycle result directly from this fact that the gases undergo during compression a cooling on their passage into the admission manifold, which may be provided if necessary with cooling means, so that the temperature of the gases from this moment is below that which would correspond to their degree of compression if this compression were effected solely in the engine cylinder, that is to say, in the usual manner. Now, it is usually sought to increase the efficiency of an engine by increasing the value of compression, but one is stopped in this direction long before the limiting conditions of mechanical resistance are reached, by the limiting conditions of temperature of the combustible mixture at the point of ignition.

One object of the present invention is to provide internal combustion engines operating with two-stage compression, comprising means whereby in operation of the engine the temperatures are lowered with respect to the pressures, so that for the same temperature at the point of ignition the compression may be increased to a much higher value and there may be obtained, as a result, an increase of efficiency or of power per unit of mass, or both.

A second object of the present invention is, after having determined the characteristics of an internal combustion engine operating according to the Sebia cycle and obtained by the particular known combination of means above described, to carry the same into practice by other suitable combinations of means, and in particular, by the combination of a centrifugal or other compressor with an engine operating with transfer of the compressed charge from one cycle to another.

It has been found according to the invention, that the operation of engines on the Sebia cycle is improved by effecting the carburation under pressure at the straight part of the curve of the two-stage compression, and to this end the invention comprises a multi-cylinder internal combustion engine comprising a compressor connected to deliver air under pressure into an admission manifold common to all of the cylinders of the engine, each of the said cylinders being provided with an admission valve having a delayed closing characteristic so as to transfer the compressed charge from one cylinder into another under the pressure obtaining in the admission manifold and during a substantial portion of the suction stroke of the cylinder receiving the transferred charge, and means for forming the combustible fuel mixture for the said engine in a closed space under a pressure equal to that obtaining in the admission manifold.

The invention may also include an internal combustion engine according to the preceding paragraph, having a carburetting device located in the pressure system of the engine and wherein means are provided for regulating the temperatures of the air supply to the carbureter and of the gas mixture from the carbureter.

According to a feature of the invention, the carburetting device being located in the pressure system of the engine, at the straight part of the curve, the increase of the temperature necessary for the carburation on the one hand and the cooling necessary for the double-stage compression on the other hand, are combined according to circumstances in the following manner:

In the first place, the gases to be transferred furnish heat. The gases admitted in one cylinder and heated by the residual gases and by the walls are transferred to the following cylinder in the cycle through the admission manifold. The temperature of these gases is, for a given engine, so much higher in proportion as the period of the transfer of the compressed charge is longer and as the rate of compression of the second stage is reduced. To cause a variation of this temperature in a given engine, it is therefore necessary to vary the setting of the transfer of the compressed charge. This regulation may be necessary due to the nature of the fuel, to the load on the engine, to the speed or to other factors, and may be obtained by modifying the setting of the closing of the admission valves which may be effected by a control which is quite independent of any other, or combined with any other, control of the engine.

Furthermore, the imparting of heat to the carburetting device by the air delivered by the compressor must be regulated, and this air must be regulated in temperature to effect, on the one hand, the lowering of the temperature between phases which is necessary for the increase of the compression without increase of the final temperature of compression, and on the other hand, to obtain in combination with the temperature of transfer of the compressed charge, conditions favorable for the carburation. This temperature may be lowered to a minimum regulated value, which may be made constant by a thermostat device, or may be variable as a function of the load, of the speed, or of other factors favorable to the conditions to be realized in using the engine.

To summarize, according to a feature of the invention, the temperatures in the system, both before and after the carburetting device are therefore made adjustable by separate means and the means and combinations employed to ensure the control thereof are regulated to furnish the heat necessary for the various possible combustibles, while obtaining a lowering of temperature between phases favorable to the increase in the rate of compression.

The above considerations lead in practice to producing, when operating with petrol, an important lowering of temperature after the first phase compression and before the inlet of air to the carbureter, the temperature of transfer being preferably utilized for re-heating the mixture in the transfer manifold, this taking place apart from the particular devices usually provided for local re-heating, such as the hot spot, or which are special to a given type of carbureter.

These conditions are favorable to a very high rate of compression, because the decrease in temperature between phases is considerable and for a final temperature corresponding to that of the ordinary engine which compresses in a single stage, the rate of compression may be considerably raised with a small transfer of the compressed charge.

On the other hand, for the use of heavy combustibles it is necessary to obtain, either in the carburetting device or in the transfer manifold, a fairly high temperature and for this the transfer of the compressed charge must be considerable and the fall of temperature before the carburetting device be limited to a value favorable both to the increase of the rate of compression and to the conditions of temperature necessary for the carburation.

It will be realized from the above that the present invention concerns all engines which permit of realizing with any compressor system, and by transfer under pressure, the operation with double-stage compression according to the Sebia cycle. Piston compressors and volumetric compressors are particularly indicated for use with engines working under load and very variable conditions, together with a constant pressure regulating device. Centrifugal compressors are more particularly indicated for use with engines working under load with but small variations in operating conditions. The centrifugal compressor permits, on the other hand, of obtaining a constant pressure at the manifold and this, by definition, since the pressure is a function of the speed of the rotor, and for a discontinuous supply the pressure remains constant at the admission because the centrifugal compressor compensates the depression occurring after shutting off the admission instead of the pulsation of the piston compressor.

The above features and advantages of the invention will be more readily apparent from the description of preferred embodiments of the invention which is given hereinafter by way of example, with reference to the accompanying drawings, in which:

Fig. 3 illustrates in side elevation the engine made and equipped according to the same form of the invention as partly disclosed in Figs. 1, 1a and 2.

Figures 1, 5:
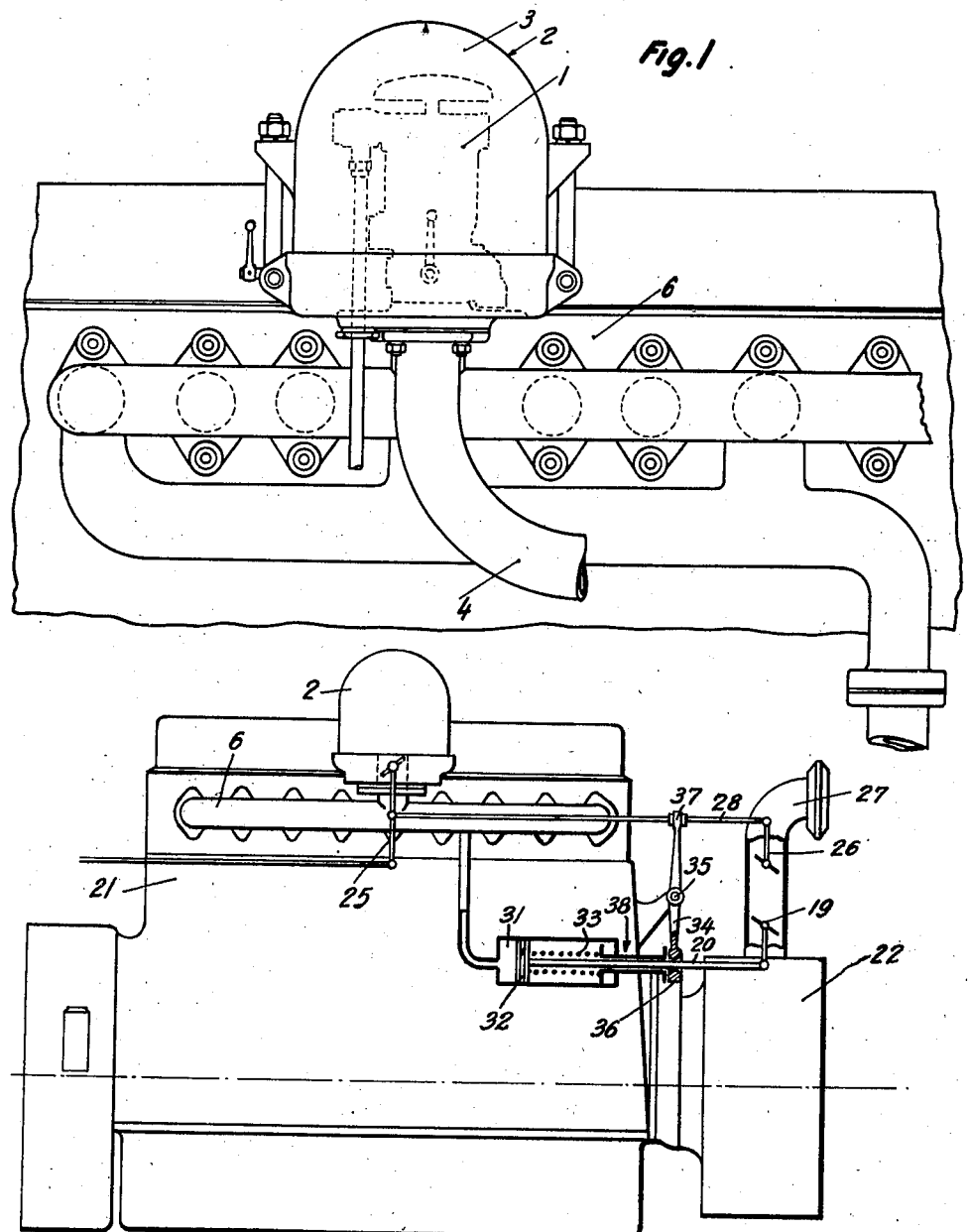
Fig. 1 is a fragmentary elevation of a preferred construction of a two stage, compression engine operating according to the invention and having the carbureter indicated in broken outline as located in the pressure circuit so as to operate on the straight part of the curve.
Fig. 5 illustrates an improvement relating to the arrangement of the various parts in a two-stage compression engine according to the invention and to a method of control of the various parts.
Figure 1A:
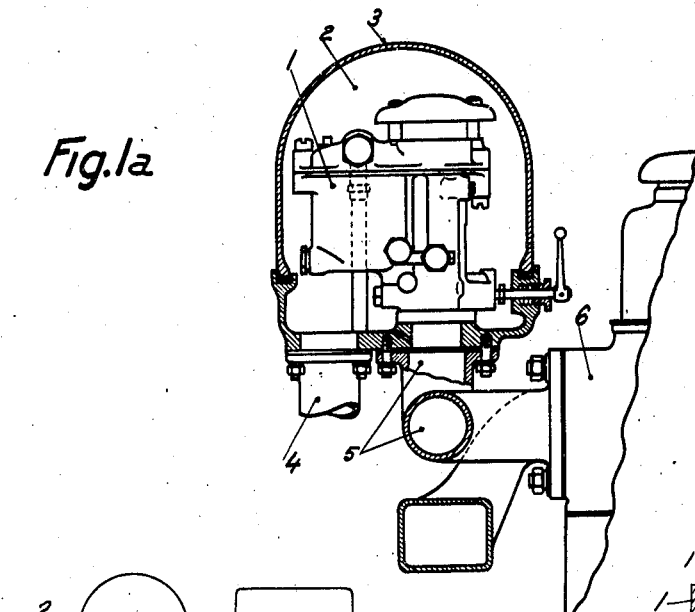
Fig. 1a is a vertical section of the cap or cover in Fig. 1, showing the carburetor in elevation.

Figures 1 and 1a are a cross section respectively, and an elevation of a carburetor provided between the compressor and the admission pipe by which the transfer from one cylinder to another is effected, Figure 1 being a cross section of the motor and Figure 1a an elevation with partial longitudinal section of the motor. To this end, the carburetor 1 is arranged under a cap 2 forming a tight cavity 3. This cavity communicates through the tube 4 with the delivery port of the compressor, whilst the outlet nozzle of the carburetor opens into the conduit 5 leading into the admission pipe 6.

Figure 2:
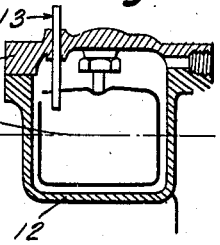
Fig. 2 is a section of part of the carburetor.

Figure 2 shows the open float system whereby the above carburetor may easily be adapted for operation under pressure. The float 11, comprising the usual closed box occupying a constant level float chamber 12, is provided with a small tube 13 open at its two extremities; this tube passes through the wall of the float and also passes through the cover of the chamber 12, in such manner that it permits the pressure obtaining under the tight cap in which the carburetor is enclosed to take effect on the inner face of the float, thus avoiding deformation of the latter.

Figure 4:
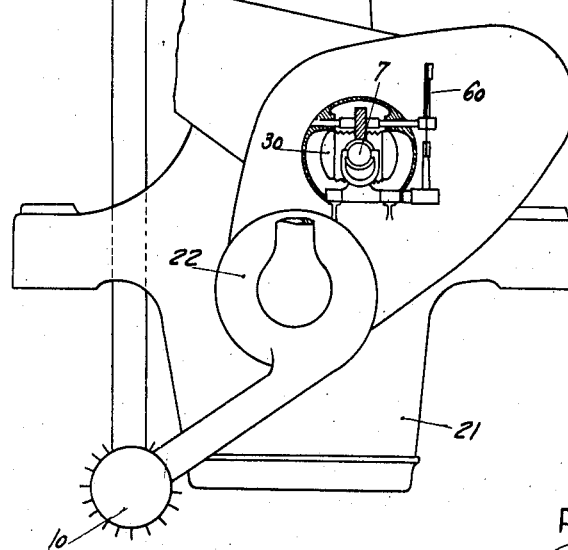
Fig. 4 is an end view of the same.

Figures 3 and 4 show respectively, an elevation in partial section and an end view of a motor provided with the improvements according to the invention. At 21 the motor is seen whose cylinders 50 are each provided with a suction valve 51 and an exhaust valve 52. The cams of the drive shaft of the valves 17 are keyed on and have such a profile outline that the opening of the admission valves is considerably extended beyond the descending stroke of the piston. At 22 is a compressor of the centrifugal type driven from the shaft of the motor 16 by means of the gears 53, 54, 55, 56. The admission manifold 6 is cooled by conventionally shown cooling means 57. At 2 we find again the tight cap containing the carburetor placed between the manifold 6 and the compressor 22, to which it is connected by the pipe 4; 25 is the lever actuating the obturator of the carburetor, 26 is the lever actuating the obturator placed on the admission manifold 27 of the compressor; the two levers 25 and 26 are joined together, for example, by the connecting rod, which may however advantageously be provided with a regulation device 29 allowing of a modification of the length thereof and consequently of a variation in the ratio of the chokings in the carburetor and the compressor. The communication between the outlet of the compressor 22 and the pipe 4 is established by means of a complex system comprising a passage 10 through a cooling device and a direct passage 9, with a distributing cock 8 making it possible to modify the proportions of air which the two passages respectively receive.

The figures also show the embodiment of an automatic regulation of transfer of the compressed charge as a function of the speed. A power supply 7 by means of helical screws of cam shafts 17 drives a centrifugal regulator 39, which by means of the displacements of its collar, transmitted by the levers 59, 60, causes the axle of an endless screw 14 to undergo angular displacements, and such rotation produces the longitudinal sliding of the pinion 15 driven by the shaft 16 of the motor and causes a certain displacement (lead or lag?) of the cam shaft 17 fixed on the pinion shaft 15 by means of a screw with inclined threads and the periods of action of the cams on the rockers of the valves undergo a certain variation as a function of the position of the masses of the regulator 39.

Figure 5 shows one embodiment of a device ensuring the automatic regulation of the output of the compressor as a function of the pressure in the admission manifold. In this figure, as in Figure 3, 21 represents the body of the engine, 22 the compressor, 6 the admission pipe, 2 the tightly closed cap or cover containing the carburetor, 25 the lever controlling the throttle valve thereof, 26 the lever controlling the principal throttle located at the admission 27 of the compressor, and 28 the rod connecting these two control levers. An auxiliary throttle 19 is arranged at the admission of the compressor, and this throttle is controlled by means of the rod 20 through a manometric device communicating with the interior of the admission manifold, this device being constituted for example by a cylinder 31, piston 32 and spring 33. A rocking arm 34 oscillating about a fixed point 35 has one of its extremities 37 hinged to the rod 28, while its other extremity 36 bears against the spring 33 through a thrust tube 38 sliding on the rod 20. The direction of opening of the throttle valve of the carburetor corresponds to the movement towards the right of the control lever 25.

When the pressure increases in the manifold, the piston 32 is displaced to the right and closes the butterfly valve 19. At the same time, the spring 33 acts by means of the pusher tube 38 on the lever 34, the point 37 of which is displaced to the left, which at the same time closes the butterfly valve of the carburetor and the principal butterfly valve of the compressor.

It will be understood that the invention is in no way limited to the details of construction hereinbefore described and that the embodiments of the invention illustrated are capable of numerous modifications as will be understood by those skilled in the art.

Having now fully described my invention, I claim:

1. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, and means for forming the combustible fuel mixture, said means being arranged in a closed space in series between said compressor and the said manifold for the purpose of feeding each cylinder of the engine with said charge during the transfer period.

2. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, and a carburettor arranged in a closed space in series between said compressor and the said manifold in order to feed each cylinder of the engine with the charge delivered by the carbureter during the transfer period.

3. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, a carburettor arranged under a tight cover, and means establishing communication between the interior of said tight cover and the interior of said manifold in order to feed each cylinder of the engine with the charge delivered by the carbureter during the transfer period.

4. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, and a carburettor arranged in a closed space in series between said compressor and the said manifold, said carburettor comprising a hollow float and a conduit establishing communication between the interior of said float and said closed space in order to feed each cylinder of the engine with the charge delivered by the carbureter during the transfer period.

5. In an internal combustion engine, the combination, with a plurality of piston cylinders, an admission manifold common to all of said cylinders, a compressor connected to deliver under pressure into said manifold, and means for regulating the admission to said compressor, of an admission valve to each of said cylinders having a delayed closing characteristic so as to transfer the charge from one cylinder into another under the pressure obtaining in said manifold and during a considerable portion of the suction stroke of the cylinder receiving said transferred charge, a carburettor arranged in a closed space in series between said compressor and the said manifold, means for regulating said carburettor and means combining the regulation of said carburettor with the regulation of the admission to said compressor.

6. In an internal combustion engine, the combination, with a plurality of piston cylinders, an admission manifold common to all of said cylinders, and a compressor connected to deliver under pressure into said manifold, means for regulating the admission to said compressor, of an admission valve to each of said cylinders having a delayed closing characteristic so as to transfer the charge from one cylinder into another under the pressure obtaining in said manifold and during a considerable portion of the suction stroke of the cylinder receiving said transferred charge, a carburettor arranged in a closed space in series between said compressor and the said manifold, means for regulating said carburettor, means combining the regulation of said carburettor with the regulation of the admission to said compressor, said last mentioned means comprising an arm interconnecting the respective regulating means of said compressor admission and said carburettor, and means for regulating the length of the said arm.

7. An internal combustion engine comprising, in combination, a plurality of piston cylinders, an admission manifold common to all of said cylinders, a compressor connected to deliver under pressure into said manifold, means for regulating the admission to said compressor, means for regulating the delivery from said compressor comprising a member movable against a counter force and displaceable by the variations of pressure in said manifold, an admission valve to each of said cylinders having a delayed closing characteristic so as to transfer the charge from one cylinder into another under the pressure obtaining in said manifold and during a considerable portion of the suction stroke of the cylinder receiving said transferred charge, a carburettor arranged in a closed space in series between said compressor and the said manifold, means for regulating said carburettor, means combining the regulation of said carburettor with the regulation of the admission to said compressor, and means combined with said last mentioned means for controlling said counter force opposing the displacement of said movable member controlling the output of said compressor.

8. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, means for forming the combustible fuel mixture in a closed space communicating with the said manifold, and means for regulating the mixture formation temperature comprising means for automatically regulating said transfer as a function of the speed of said engine.

9. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, means for forming the combustible fuel mixture in a closed space in series between said compressor and the said manifold, and means for regulating the time and interval length of said transfer in order to regulate the mixture formation temperature in the engine.

10. In an internal combustion engine, the combination with a plurality of piston cylinders, and an admission valve to each of said cylinders having a delayed closing characteristic so as to transfer the charge from one cylinder into another under the pressure obtaining in said manifold and during a considerable portion of the suction stroke of the cylinder receiving said transferred charge, of a compressor connected to deliver a constant pressure into said manifold, said compressor being of centrifugal type.

11. In an internal combustion engine, the combination with a plurality of piston cylinders, an admission manifold common to all of said cylinders, and an admission valve to each of said cylinders having a delayed closing characteristic so as to transfer the charge from one cylinder into another under the pressure obtaining in said manifold and during a considerable portion of the suction stroke of the cylinder receiving said transferred charge, of a compressor connected to deliver a constant pressure into said manifold, said compressor being of centrifugal type, and cooling means for the said admission manifold.

12. In an internal combustion engine, the combination with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, means for forming the combustible fuel mixture in a closed space in series between the said compressor and the said manifold, and cooling means for the said manifold.

13. In an internal combustion engine, the combination with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, means for forming the combustible fuel mixture in a closed space in series between the said compressor and the said manifold, and cooling means for the connection between the said compressor and the said closed space.

14. In an internal combustion engine, the combination with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, means for forming the combustible fuel mixture in a closed space in series between the said compressor and the said manifold, cooling means for the connection between the said compressor and the said closed space, and cooling means for the said manifold.

15. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, and means for forming the combustible fuel mixture, said means being arranged in a closed space in series between said compressor and said manifold for the purpose of feeding each cylinder of the engine with said charge during the transfer period, and including means for automatically adjusting the fuel supply according to the pressure in said space.

16. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, and a carburetor arranged in a closed space in series between said compressor and said manifold, in order to feed each cylinder of the engine with the charge delivered by the carburetor during the transfer period, and including means for automatically adjusting the fuel supply according to the pressure in said space.

17. In an internal combustion engine, the combination, with a plurality of piston cylinders, an admission manifold common to all of said cylinders, and a compressor connected to deliver under pressure into said manifold, of an admission valve to each of said cylinders having a delayed closing characteristic so as to transfer the charge from one cylinder into another under the pressure obtaining in said manifold and during a considerable portion of the suction stroke of the cylinder receiving said transferred charge, a carburetor arranged under a tight cover, and means establishing communication between the interior of said tight cover and the interior of said manifold in order to feed each cylinder of the engine with the charge delivered by the carburetor during the transfer period, and including means for automatically adjusting the fuel supply according to the pressure in said space.

PAUL DUGELAY.